United States Patent
Belleville

(10) Patent No.: US 9,447,733 B2
(45) Date of Patent: Sep. 20, 2016

(54) GAS TURBINE ENGINE FUEL SYSTEM WITH ECOLOGY VALVE

(71) Applicant: Pratt & Whitney Canada Corp., Longueuil (CA)

(72) Inventor: Francois Belleville, Varennes (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 670 days.

(21) Appl. No.: 13/886,334

(22) Filed: May 3, 2013

(65) Prior Publication Data
US 2014/0352314 A1      Dec. 4, 2014

Related U.S. Application Data

(60) Provisional application No. 61/783,086, filed on Mar. 14, 2013.

(51) Int. Cl.
*F02C 7/232*      (2006.01)

(52) U.S. Cl.
CPC ..................... *F02C 7/232* (2013.01)

(58) Field of Classification Search
CPC ........ F02C 7/228; F02C 7/232; F02C 7/236; F02C 9/26
See application file for complete search history.

(56) References Cited

U.S. PATENT DOCUMENTS

| | | |
|---|---|---|
| 4,402,184 A | 9/1983 | Faulkner et al. |
| 5,036,657 A | 8/1991 | Seto et al. |
| 5,257,502 A | 11/1993 | Napoli |
| 5,465,570 A | 11/1995 | Szillat et al. |
| 5,598,698 A | 2/1997 | Szillat et al. |
| 5,735,117 A | 4/1998 | Toelle |
| 5,881,550 A | 3/1999 | Toelle |
| 6,334,296 B2 | 1/2002 | Futa, Jr. et al. |
| 6,385,962 B2 | 5/2002 | Futa, Jr. et al. |
| 6,393,823 B1 | 5/2002 | Badeer |
| 6,422,021 B1 | 7/2002 | Futa, Jr. et al. |
| 6,484,510 B2 | 11/2002 | Futa, Jr. et al. |
| 6,751,939 B2 | 6/2004 | Futa, Jr. et al. |
| 6,857,272 B2 | 2/2005 | Summerfield et al. |
| 7,007,476 B2 | 3/2006 | Mains et al. |
| 7,093,420 B2 | 8/2006 | Futa, Jr. et al. |
| 7,131,274 B2 * | 11/2006 | Baryshnikov ........... F02C 7/232 60/772 |
| 7,269,939 B2 | 9/2007 | Kothnur et al. |
| 7,950,215 B2 | 5/2011 | Chhabra et al. |
| 8,046,983 B2 | 11/2011 | Lawrence et al. |
| 8,122,699 B2 | 2/2012 | Lawrence et al. |
| 8,590,310 B2 * | 11/2013 | Gibbons ................. F02C 9/263 60/734 |

\* cited by examiner

*Primary Examiner* — Arun Goyal
(74) *Attorney, Agent, or Firm* — Norton Rose Fulbright Canada LLP

(57) ABSTRACT

A gas turbine engine fuel system has an ecology valve for withdrawing residual fuel from primary and secondary fuel manifolds upon engine shut-down. The ecology valve has primary and secondary reservoirs respectively connected in fluid flow communication with the primary and secondary fuel manifolds. The valve further has a reciprocating piston movable from a retracted position when engine start-up is initiated to an extended position which the piston assumes under normal engine running conditions. The movement of the reciprocating piston between the retracted and extended positions controls the flow of fuel from and to the primary and secondary reservoirs. A cross-bleed passage is defined in the reciprocating piston. The cross-bleed passage connects the primary and secondary reservoirs in fluid flow communication only when the piston is in its extended position. In this way, the cross-bleed flow between the primary and secondary fuel manifolds may be initiated only at the end of the engine start-up phase.

14 Claims, 3 Drawing Sheets

GAS TURBINE ENGINE FUEL SYSTEM WITH ECOLOGY VALVE

CROSS-REFERENCE TO RELATED APPLICATIONS

The present application claims priority on U.S. Provisional Application No. 61/783,086 filed on Mar. 14, 2013, the entire content of which is incorporated herein by reference.

TECHNICAL FIELD

The application relates generally to gas turbine engines and, more particularly, to a fuel system having multiple manifolds for feeding different sets of fuel nozzles.

BACKGROUND OF THE ART

Known fuel systems having multiple fuel manifolds may include a flow divider valve which is used to sequence and schedule the fuel flow between various groups of fuel nozzles and/or between separate fuel manifold feeding such nozzles. The use of such a flow divider valve provides flexibility to better control the fuel spray in the combustion chamber from each of the groups of fuel nozzles fed by their respective independent manifold. Typically, such flow divider valves are configured such that they will open at a predetermined pressure which corresponds to a given fuel flow. Above this predetermined pressure, fuel is fed to the secondary manifold, whereas below this pressure fuel is fed only to the primary fuel manifold.

It is desirable to be able to bleed fuel from the primary manifold to the secondary manifold in order to ensure that the secondary fuel nozzles always remain primed, even at low burn flow conditions. However, at start-up, such a cross-bleed flow between the manifolds may prevent proper atomization of the fuel sprayed in the combustion chamber and is thus not suitable.

SUMMARY

In one aspect, there is provided a gas turbine engine fuel system comprising: a fuel supply line, a flow divider valve having an inlet connected in fluid flow communication with the fuel supply line for receiving a fuel flow therefrom, the flow divider valve having at least a primary outlet and a secondary outlet and a valve member for controlling the flow of fuel from the inlet to the primary and secondary outlets, a primary fuel manifold having a primary inlet connected in fluid flow communication with the primary outlet of the flow divider valve for feeding a set of primary fuel nozzles arranged to spray fuel in a combustion chamber, a secondary fuel manifold having a secondary inlet connected in fluid flow communication with the secondary outlet of the flow divider valve for feeding a set of secondary fuel nozzles arranged to spray fuel in the combustion chamber, an ecology valve having primary and secondary reservoirs, the primary reservoir having a primary port connected in fluid flow communication with the primary fuel manifold, the secondary reservoir having a secondary port connected in fluid flow communication with the secondary fuel manifold, the ecology valve further having a reciprocating piston moveable between a retracted position to draw fuel from the primary and secondary fuel manifolds respectively into the primary and secondary reservoirs and an extended position to expel fuel out from the primary and secondary reservoirs back into the primary and secondary fuel manifolds, and a cross-bleed passage defined in the reciprocating piston of the ecology valve, the cross-bleed passage establishing fluid flow communication from the primary fuel manifold to the secondary fuel manifold only when the reciprocating piston is in its extended position to allow a portion of the fuel from the primary outlet of the flow divider valve to be diverted to the secondary fuel manifold from the moment the reciprocating piston reaches its extended position.

In another aspect, there is provided an ecology valve for withdrawing residual fuel from primary and secondary fuel manifolds of a gas turbine engine upon engine shut-down, the ecology valve comprising: a primary reservoir having a primary port connectable in fluid flow communication with the primary fuel manifold, a secondary reservoir connectable in fluid flow communication with the secondary fuel manifold, a reciprocating piston movable from a retracted position when engine start-up is initiated to an extended position which is assumed by the piston under normal engine running conditions, the movement of the reciprocating piston between the retracted and extended positions controlling the flow of fuel from and to the primary and secondary reservoirs, and a cross-bleed passage defined in the reciprocating piston, the cross-bleed passage connecting the primary and secondary reservoirs in fluid flow communication only when the piston is in its extended position.

In a further aspect, there is provided a method of providing fuel cross-bleed between primary and secondary fuel manifolds of a gas turbine engine including an ecology valve having a reciprocating piston for withdrawing residual fuel from the primary and secondary fuel manifolds upon engine shut-down, the method comprising: initiating an engine start-up phase, including directing a primary fuel flow to said primary fuel manifold and displacing the reciprocating piston from an engine shut-down position to an engine running position; and at the end of the engine start-up phase when the reciprocating piston reaches its engine running position, bleeding through the ecology valve a portion of a primary fuel flow to the secondary fuel manifold.

DESCRIPTION OF THE DRAWINGS

Reference is now made to the accompanying figures in which.

DETAILED DESCRIPTION

Figure 1:
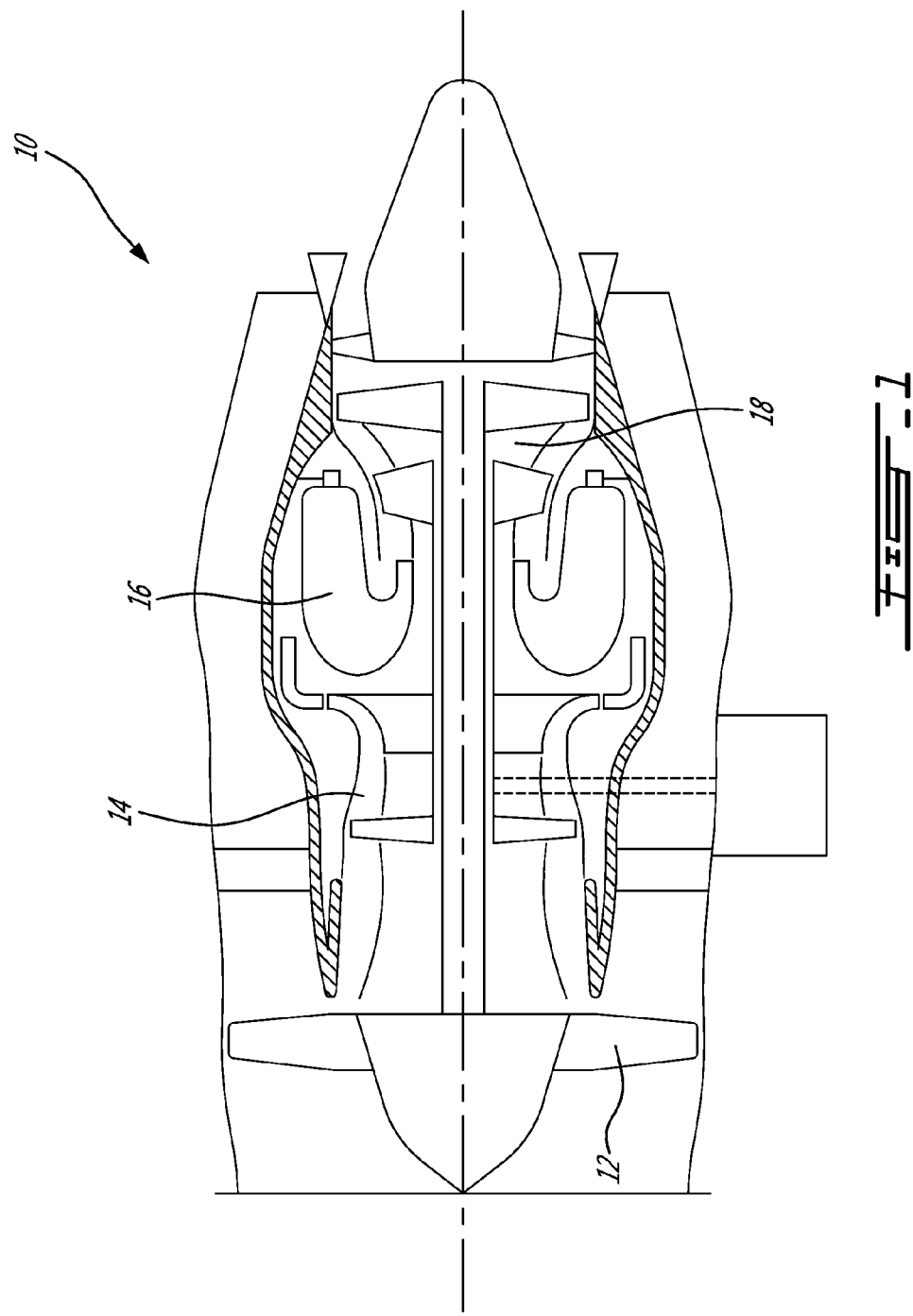
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Figure 2:
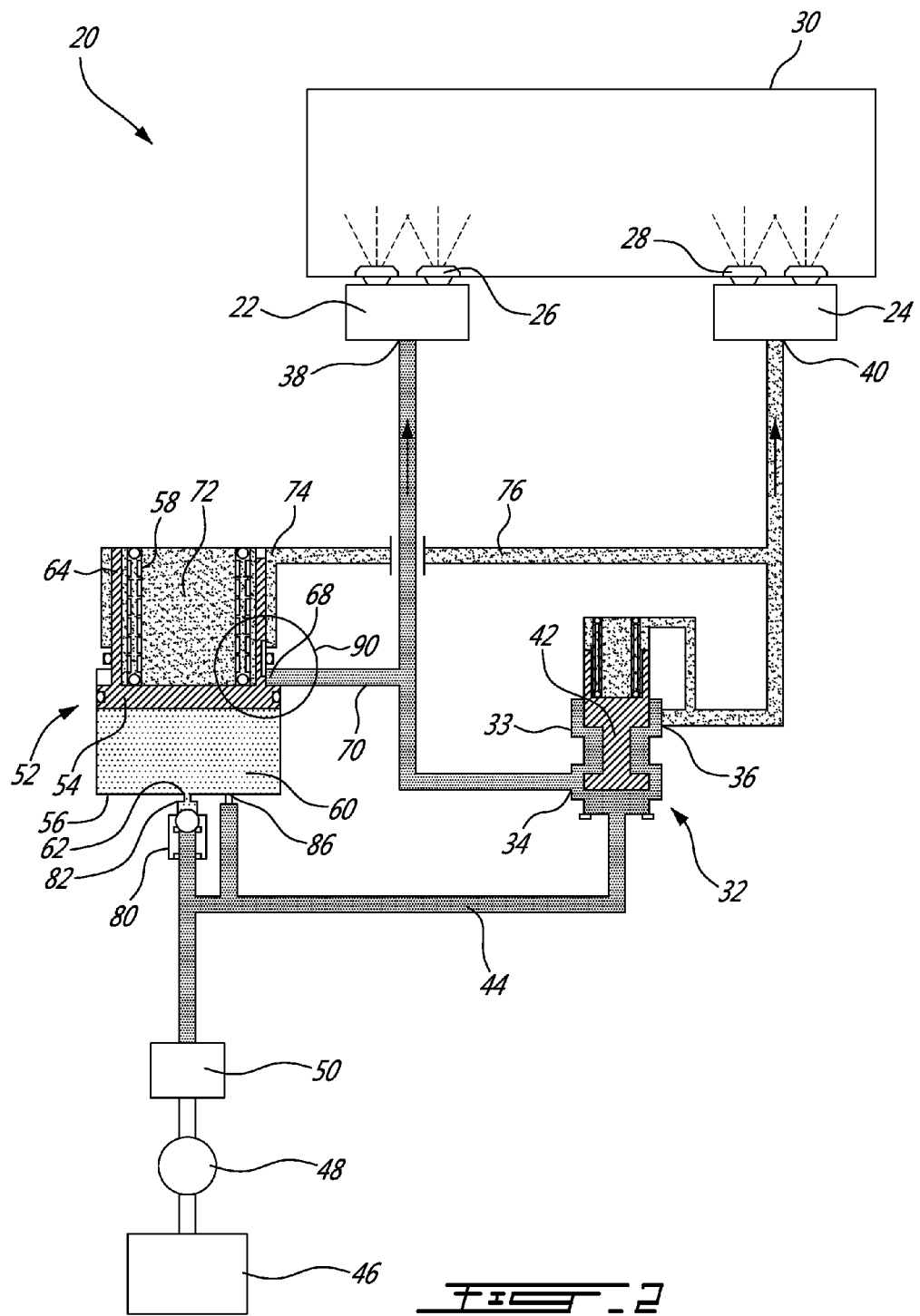
FIG. 2 is a schematic representation of a fuel supply system which may be used to inject fuel in the combustion chamber of a combustor of the engine shown in FIG. 1, the fuel system comprising a flow divider valve and an ecology valve with a cross-bleed passage integrated in the ecology valve for providing a fluid flow connection between primary and secondary fuel manifolds when the ecology valve is in an engine running position.

FIG. 2 illustrates a fuel supply system 20 which may comprise a primary manifold 22 and a secondary manifold 24. The manifolds 22, 24 feed respective groups of primary and secondary fuel nozzles 26, 28 disposed for injecting fuel in a combustion chamber 30 of the combustor 16. The primary fuel nozzles 26 may be used to initiate the combustion process during engine start-up, while the secondary nozzles 28 may be used to supplement and intensify the combustion process once the primary flow is burning steadily.

As can be appreciated from FIG. 2, a flow divider valve 32 has a valve body 33 defining primary and secondary outlets 34, 36 connected in fluid flow communication with respective inlets 38, 40 of the primary and secondary fuel manifolds 22, 24. The flow divider valve 32 has a valve member 42 displaceable within the valve body 33 between various operational positions to sequence and schedule the fuel flow between the primary and secondary fuel manifolds 22, 24. For instance, during engine start-up, the flow divider valve 36 may be operated so that fuel may be initially supplied only to the primary fuel nozzles 26. However, once fuel from the primary fuel nozzles 26 is burning in a steady and satisfactory manner, the divider valve 32 may be operated to also supply fuel to the secondary fuel nozzles 28. Fuel may be supplied to the flow divider valve 32 via a supply line 44 connected to a fuel source which may include a fuel supply 46, a pump 48 for pumping fuel from the fuel supply 46 to a metering units 50 adapted to supply the fuel at a desired pressure and a desired flow rate.

The fuel system 20 may also comprise an ecology valve 52 for withdrawing any residual fuel in the primary and secondary manifolds 22, 24 upon engine shut-down and directing the stored residual fuel back into the manifolds upon the next engine start-up procedure. The fuel remaining in the manifolds 22, 24 after engine shut-down may cause engine and environmental problems (e.g. coking of the nozzles and pollutant fume emissions) and should, thus, be removed. As will be seen hereinafter, this is the first and main role played by the ecology valve 52, the second being to provide a cross-bleed from the primary manifold 22 to the secondary manifold 24 after the engine start-up phase as been completed.

By analogy, the ecology valve 52 may be viewed as a syringe with a piston reciprocally movable within a chamber to draw or expel two separate fluids (i.e. the primary fuel and the secondary fuel). More particularly, the ecology valve 52 generally comprises a reciprocating piston 54 slidably mounted in a housing 56. A biasing member, such as a spring 58, is mounted within the housing 56 for returning the piston 54 to a retracted position (FIG. 3a) upon engine shut-down. A variable volume pressure chamber 60 is defined between one end of the housing 56 and a pressure surface of the piston 54 on a side thereof opposite to the spring 58. The pressure chamber 60 has a pressure port 62 connected in fluid flow communication with the fuel supply line 44. Accordingly, when the pressure in the supply line 44 reaches a predetermined value during engine start-up, the biasing force provided by the spring 58 is overcome by the fluid pressure in the pressure chamber 60, thereby causing the piston 54 to move from the retracted position shown in FIG. 3a to the extended position shown in FIGS. 2 and 3b.

Conversely, when the engine is shut down and the fuel supply is interrupted or whenever the pressure in the fuel supply line 44 drops below the above mentioned predetermined value, the biasing force of the spring 58 brings back the piston 54 to its retracted position. By so connecting the ecology valve 52 to the fuel supply line 44, the piston and, thus, the ecology valve can be controlled/operated as a function of the operating state of the engine (start-up, engine running or shut-down conditions). As will be seen herein after, the piston acts as a flow control means that is responsive to the engine operating conditions (start-up, engine running or engine shut-up) to selectively draw the fuel from the primary and secondary manifolds 22, 24 and to return the fuel thereto.

Figure 3A:
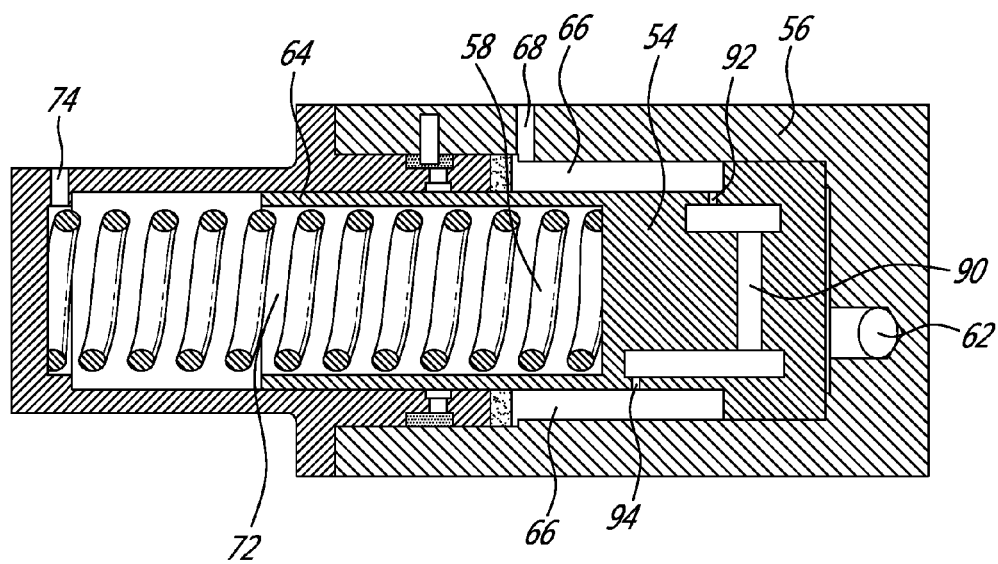
FIG. 3a is an enlarged cross-sectional view of the ecology valve shown in a retracted or engine shut-down position.
Figure 3B:
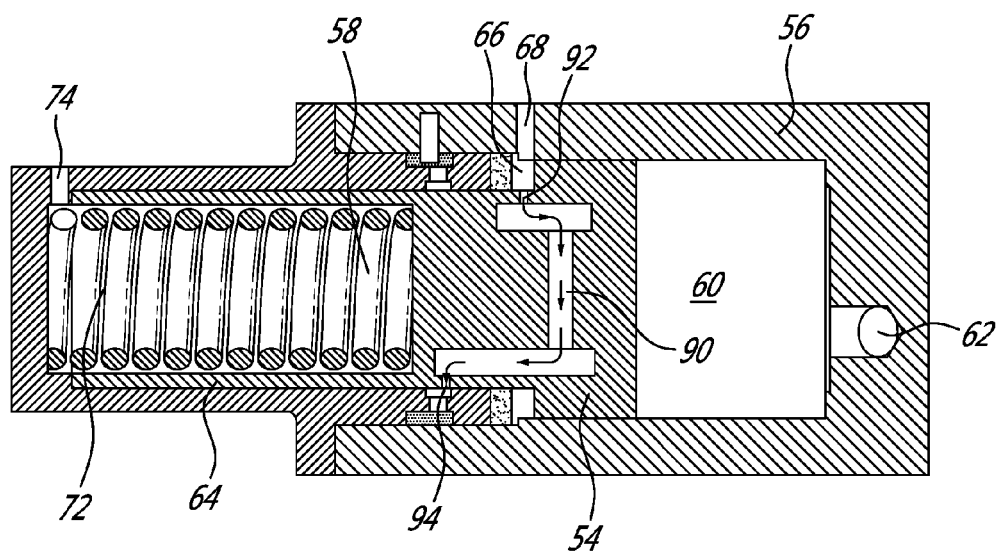
FIG. 3b is an enlarged cross-sectional view of the ecology valve shown in an extended or engine running position and illustrating how the cross-bleed passage defined in the reciprocating piston of the ecology valve interconnects the primary and secondary fuel flow paths when the piston reaches the end of its stroke.

As best shown in FIGS. 3a and 3b, the piston 54 may have a hollow cylindrical stem portion 64 in which the spring 58 is received. A variable volume primary reservoir 66 is defined within the housing 56 about the stem 64 for storing any residual fuel drawn from the primary manifold 22. In that regard, the primary reservoir 66 has a primary port 68 which is connected in fluid flow communication with the primary fuel manifold 22 downstream from the flow divider valve 32 via primary line 70. Accordingly, when the piston 54 moves from its extended position (FIGS. 2 and 3b) to its refracted position (FIG. 3a) under the action of the spring 58 such as at engine shut-down, a suction or negative pressure is created at the primary port 68, thereby causing any residual fuel in the primary fuel manifold 22 to flow into the primary reservoir 66 of the ecology valve 52 via primary line 70. However, when the piston 54 is displaced from its retracted position to its extended position under the pressure exerted by the fuel in pressure chamber 60 (such as during engine start-up and under normal engine operating conditions), the fuel in the primary reservoir 66 is expelled out of the ecology valve 52 and directed back to the primary fuel manifold 22 via primary line 70.

Still referring to FIGS. 3a and 3b, it can also be appreciated that the ecology valve 52 also defines a variable volume secondary reservoir 72 for storing residual fuel withdrawn from the secondary manifold 24. The secondary reservoir 72 may be at least partly defined by the internal volume of the hollow stem portion 64 of the piston 54. The secondary reservoir 72 has a secondary port 74 which is connected in fluid flow communication with the secondary fuel manifold 24 downstream from the flow divider valve 32 via secondary line 76. Therefore, when the piston 54 moves from the extended position to its retracted position, a negative pressure is created at port 74, thereby causing any residual fuel in the secondary fuel manifold 24 to flow from the secondary fuel manifold 24 into the secondary reservoir 72 via secondary line 76. The fuel stored in the secondary reservoir 72 of the ecology valve 52 during periods of engine inactivity is directed back into the secondary fuel manifold 24 when the piston 54 is displaced to its extended position by the fuel pressure in the supply line 44 at the next engine start up procedure.

It can be appreciated that the volume of the primary and secondary reservoirs 66, 72 changes as the piston 54 moves between the refracted and extended positions. The volume of the reservoirs 66, 72 will be maximal when the piston 54 is in its retracted position as shown in FIG. 3a. As mentioned hereinbefore, the retracted position corresponds to the position assumed by the piston 54 under engine shut-down conditions (i.e. when the engine is no longer operated). Accordingly, the maximum volume of the reservoirs 66, 72 is selected to be sufficient to store the maximum quantity of residual fuel that the ecology valve 52 may have to draw from the manifolds 22, 24 upon engine shut-down.

As shown in FIG. 2, a restricting orifice 82 may be provided immediately upstream of pressure port 62 to adjust the rate of travel of the piston 52. An outlet port 86 with a different restricting orifice or with another suitable flow control device may be provided to allow the piston 54 to have a different rate of travel along its return stroke. In this, case a one-way valve 80 may be disposed between the supply line 44 and the pressure port 62 to prevent fuel to flow out from the pressure chamber 60 via pressure port 62.

As schematically depicted in circled area 90 in FIG. 2, a cross-bleed passage between the primary and secondary fuel flow paths downstream of the flow diverter valve 32 may be integrated in the piston 54 of the ecology valve 52 to bleed a small portion of the primary fuel flow to the secondary fuel manifold 24 but only upon the piston 54 reaching its fully extended position (FIG. 3*b*) that is at the end of the engine start-up phase.

The bleed flow from the primary fuel flow path to the secondary fuel flow path is suitable to ensure that the secondary fuel manifold 24 remains primed, even at low burn flow conditions. For example, this may be required when the engine operates at low power and at high altitude. Without this cross-bleed flow between the primary and secondary manifolds 22, 24 being permitted, it may not be possible to operate the engine at low enough power in order to meet the engine operability requirements and may also lead to the inability to rapidly re-accelerate the engine from this operating position. Operating the engine with the secondary nozzles 28 un-primed may create a lag in engine response to fuel command. Such a lag may last for the duration of secondary manifold air purging and eventually result in excess fuel command and delivery causing engine surge.

As shown in greater details in FIGS. 3*a* and 3*b*, the cross-bleed passage 90 may be drilled or otherwise suitably formed in the piston 54. The cross-bleed passage 90 has an inlet 92 which remain in fluid flow communication with the primary reservoir 66 along the full stroke of the piston 54. The cross-bleed passage 90 has an outlet 94 which is axially spaced from the inlet 90 along a stroke direction of the piston 54. When the piston is in its retracted position, as shown in FIG. 3*a*, the outlet 94 is in fluid flow communication with the primary reservoir 66. In this position, there is no pressure difference between the inlet 92 and the outlet 94 since both the inlet 92 and the outlet 94 communicate with the primary reservoir 66. Accordingly, there is no flow through the cross-bleed passage 90 when the piston 54 is in this position. However, when the piston 54 reaches its fully extended position, as shown in FIG. 3*b*, the inlet 92 of the cross-bleed passage 90 is still in fluid flow communication with the primary reservoir 66 but the outlet 94 is now in flow communication with the secondary reservoir 72 and, thus, with the secondary fuel manifold 24 via secondary line 76. Accordingly, when the piston 54 is in the extended position shown in FIG. 3*b*, a portion of the primary fuel supplied by the divider valve 32 to the primary fuel nozzle 22 will be bled to the secondary manifold 24 via the ecology valve 52.

By so integrating the cross-bleed passage 90 in the piston 54 of the ecology valve 52, it is possible to delay cross-bleed between primary manifold 22 and secondary manifold 24 until the very end of the engine start-up phase (corresponding to the fully extended position of the piston as shown in FIGS. 2 and 3*b* (also referred to as the engine running condition). This has some benefits in that initiating cross-bleed right from the beginning of the engine start-up phase has a detrimental effect on the engine start procedure. Indeed, it is preferable to initially flow only the primary manifold 22 and not the secondary nozzles 28 in order to have optimum initial fuel atomization and combustion.

The above described cross-bleed valve arrangement takes advantage of the ecology valve which is fully retracted at the beginning of the start and fully extended at the end of the engine start-up procedure. Introducing a cross-bleed arrangement that can only provide a cross-bleed flow when the ecology valve is fully extended ensures the engine start-up phase is not impacted while giving the above mentioned benefit when the engine is running. The ecology valve displacement rate is chosen to control and optimize the time at which the cross-bleed occurs after start initiation.

The cross-bleed passage may be retrofitted to existing ecology valve. Also, the ecology valve could be used for other purposes. Indeed, it could also be used as a mean to change the FDV pressure such that a higher pressure is obtain during the starting providing improved nozzle performance at lower fuel flow and provide a lower pressure after the ecology valve has extended giving an optimum pressure for higher fuel flow following engine start. For example, this could provide a 180 psid flow diverter valve (FDV) when the ecology valve is retracted (during start) and a 90 psid FDV when the ecology valve is extended. It is also pointed out that the cross-bleed flow can be provided and controlled without resorting to any additional flow control equipment.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. An ecology valve for withdrawing residual fuel from a primary fuel manifold and a secondary fuel manifold of a gas turbine engine upon the gas turbine engine shut-down, the ecology valve comprising:
   a variable volume primary reservoir having a primary port connectable in fluid flow communication with the primary fuel manifold;
   a variable volume secondary reservoir connectable in fluid flow communication with the secondary fuel manifold;
   a reciprocating piston movable within the variable volume primary reservoir and the variable volume secondary reservoir from a retracted position when engine start-up is initiated to an extended position which is assumed by the piston under normal engine running conditions, the movement of the reciprocating piston between the retracted position and the extended position reducing respective volumes of the variable volume primary reservoir and of the variable volume secondary reservoir, thereby flowing the fuel from the variable volume primary reservoir and the variable volume secondary reservoir to the primary fuel manifold and the secondary fuel manifold, respectively; and
   a cross-bleed passage defined in the reciprocating piston, the cross-bleed passage connecting the variable volume primary reservoir and the variable volume secondary reservoir in fluid flow communication only when the piston is in its extended position, the cross-bleed passage having an inlet and an outlet which are both in fluid flow communication with the variable volume primary reservoir when the reciprocating piston is in its retracted position.

2. The ecology valve defined in claim 1, wherein the inlet of the cross-bleed passage is connected in fluid flow communication with the variable volume primary reservoir irrespective of the position of the reciprocating piston, the outlet being connected in fluid flow communication with the variable volume secondary reservoir only when the reciprocating piston reaches its extended position.

3. The ecology valve defined in claim 1, wherein the cross-bleed passage establishes fluid flow communication between the primary fuel manifold and the secondary fuel manifold via variable volume primary reservoir and the variable volume secondary reservoir of the ecology valve.

4. The ecology valve defined in claim 1, further comprising a pressure chamber adapted to be connected in fluid flow communication with a fuel supply line, the reciprocating piston being movable from the retracted position and the extended position by the fuel pressure in the pressure chamber.

5. The ecology valve defined in claim 1, wherein the variable volume secondary reservoir is defined in part in a spring chamber defined in a stem portion of the reciprocating piston, the spring chamber having a spring urging the reciprocating piston towards its retracted position.

6. A gas turbine engine fuel system comprising:
a fuel supply line;
a flow divider valve having an inlet connected in fluid flow communication with the fuel supply line for receiving a fuel flow therefrom, the flow divider valve having at least a primary outlet and a secondary outlet and a valve member for controlling the flow of fuel from the inlet to the primary outlet and the secondary outlet;
a primary fuel manifold having a primary inlet connected in fluid flow communication with the primary outlet of the flow divider valve for feeding a set of primary fuel nozzles arranged to spray fuel in a combustion chamber;
a secondary fuel manifold having a secondary inlet connected in fluid flow communication with the secondary outlet of the flow divider valve for feeding a set of secondary fuel nozzles arranged to spray fuel in the combustion chamber;
an ecology valve having a variable volume primary reservoir and a variable volume secondary reservoir, the variable volume primary reservoir having a primary port connected in fluid flow communication with the primary fuel manifold, the variable volume secondary reservoir having a secondary port connected in fluid flow communication with the secondary fuel manifold, the ecology valve further having a reciprocating piston moveable within the variable volume primary reservoir and the variable volume secondary reservoir between a retracted position to draw fuel from the primary fuel manifold and the secondary fuel manifold respectively into the variable volume primary reservoir and the variable volume secondary reservoir and an extended position to expel fuel out from the variable volume primary reservoir and the variable volume secondary reservoir back into the primary fuel manifold and the secondary fuel manifold respectively,
wherein movement of the reciprocating piston between the retracted position and the extended position causes respective volumes of the variable volume primary reservoir and the variable volume secondary reservoir to go from an expanded volume to a reduced volume; and
a cross-bleed passage defined in the reciprocating piston of the ecology valve, the cross-bleed passage establishing fluid flow communication from the primary fuel manifold to the secondary fuel manifold only when the reciprocating piston is in its extended position to allow a portion of the fuel from the primary outlet of the flow divider valve to be diverted to the secondary fuel manifold from the moment the reciprocating piston reaches its extended position.

7. The gas turbine engine fuel system defined in claim 6, wherein the cross-bleed passage has an inlet and an outlet, the inlet being connected in fluid flow communication with the variable volume primary reservoir irrespective of the position of the reciprocating piston, the outlet being connected in fluid flow communication with the variable volume secondary reservoir only when the reciprocating piston reaches its extended position.

8. The gas turbine engine fuel system defined in claim 6, wherein the cross-bleed passage establishes fluid flow communication between the primary fuel manifold and the secondary fuel manifold via the variable volume primary reservoir and the variable volume secondary reservoir of the ecology valve.

9. The gas turbine engine fuel system defined in claim 6, wherein said ecology valve has a pressure chamber connected in fluid flow communication with the fuel supply line, the reciprocating piston being movable from the retracted position and the extended position by the fuel pressure in the pressure chamber.

10. The gas turbine engine fuel system defined in claim 9, wherein a biasing member urges the reciprocating piston towards its retracted position, and wherein when the fuel pressure in the pressure chamber becomes greater than a biasing force of the biasing member, the reciprocating piston is displaced from its retracted position to its extended position.

11. A method of providing fuel cross-bleed between a primary fuel manifold and a secondary fuel manifold of a gas turbine engine including an ecology valve having a reciprocating piston movable within a variable volume primary reservoir and a variable volume secondary reservoir for withdrawing residual fuel from the primary fuel manifold and the secondary fuel manifold respectively upon engine shut-down, the method comprising:
initiating an engine start-up phase, including directing a primary fuel flow to said primary fuel manifold;
displacing the reciprocating piston from a retracted position at an engine shut-down position to an extended position at an engine running position so as to reduce respective volumes of the variable volume primary reservoir and the variable volume secondary reservoir; and
only at the end of the engine start-up phase when the reciprocating piston reaches the extended position at its engine running position, bleeding through a cross-bleed passage defined in the reciprocating piston of the ecology valve a portion of the fuel from the primary fuel manifold to the secondary fuel manifold.

12. The method defined in claim 11, wherein the bleeding comprises moving the cross-bleed passage from a non-operational position to an operational position in which the cross-bleed passage interconnects the primary fuel manifold and the secondary fuel manifold, said operational position corresponding to the running engine position of the reciprocating piston.

13. The method defined in claim 12, wherein the moving the cross-bleed passage is accomplished by moving the reciprocating piston.

14. The method defined in claim 13, wherein the cross-bleed passage is defined in the reciprocating piston.

* * * * *